Patented Nov. 25, 1930

1,783,086

UNITED STATES PATENT OFFICE

CARL HANER, OF MOYLAN, PENNSYLVANIA, ASSIGNOR TO PUBLICKER, INC., OF PHILADELPHIA, PENNSYLVANIA, A CORPORATION OF DELAWARE

METHOD OF TREATING ETHYL ALCOHOL

No Drawing. Application filed October 3, 1928. Serial No. 310,196.

My invention relates to a method of treating ethyl alcohol and more particularly to a method of removing water therefrom.

One object of my invention is to provide an economical and efficient method of removing water from an alcohol-water mixture with the result that alcohol may easily be obtained containing less water than that of the constant boiling mixture.

A further object is to provide a process of concentrating alcohol beyond the constant boiling mixture by a distillation process at atmospheric pressure which process is simple to manipulate and control due to the use of a dehydrating agent soluble in the mixture.

Still another object is to provide a method of dehydrating alcohol in which the dehydrating agent will be in a liquid condition at the end of and at the temperature of distillation and therefore which can be easily handled, but which without further treatment, when cooled, will solidify with no loss of dehydrating agent. Other objects will be apparent from a consideration of the specification and claims.

Ethyl alcohol and water form a constant boiling mixture at atmospheric pressure containing slightly over 96% of alcohol. For many uses, an alcohol containing less water is necessary and since further simple distillation at atmospheric pressure will not increase the percentage of alcohol, other processes must be used. The concentration of alcohol may be raised by a distillation process in which a fractionating column under reduced pressure is employed, but this method, besides requiring special expensive apparatus, is difficult to control.

My invention contemplates a distillation process at atmospheric pressure characterized by the use of a dehydrating agent soluble in the alcohol-water mixture, such soluble dehydrating agents being typified by the alkali hydroxides such as sodium or potassium hydroxide. The use of these dehydrating agents also give an aldehyde-free distillate since they form with the aldehyde a non-distillable resin.

In a typical case, in carrying out the process the alcohol-water mixture which may or may not be the constant boiling mixture is added to a kettle equipped with an agitating apparatus and connected to a simple condenser. After the agitator is set in motion, the solid dehydrating agent is placed in the liquid and the stirring continued until a complete solution is obtained. The percentage of dehydrating agent to liquid may vary, .8 pound of alkali hydroxide to one gallon of liquid being typical. Heat is then applied to the kettle and the alcohol vapors which are evolved are condensed and withdrawn from the condensing apparatus. By this improved method, alcohol of 98% to 98½% purity can be obtained. One familiar with the difficulties encountered in concentrating alcohol above the constant boiling mixture will recognize that the raising of the concentration to 98% or more is a marked increase.

The distillation from the agitating kettle is continued and the fraction of alcohol collected until the concentration of alcohol falls below that percentage desired, say 98%. When this point is reached, the distillation is continued but the distillate is collected in a separate container. The distillation is continued until 90% to 98% of the alcohol originally added to the kettle has been recovered. This second fraction whose alcohol content is below the desired percentage (98%) may be added to the alcohol-water mixture and redistilled with that according to the present process, or if it should be materially below the constant boiling mixture, it may be brought to that concentration by simple distillation and then the constant boiling mixture distilled as herein described.

One of the improved features of the present invention resulting from the solubility of the dehydrating agent in the alcohol-water mixture is the ease with which the dehydrating agent may be handled. In distilling the final fraction of alcohol as hereinbefore pointed out, 90% to 98% of the alcohol is recovered, the remaining alcohol and water being left with the dehydrating agent in the kettle so that the mass in the kettle will remain in a liquid condition at the temperature of distillation. There is insufficient solvent in the dehydrating agent, however, to prevent its solidification at room temperature. Thus the hot liquid may be run into drums where it will solidify with a full recovery of the dehydrating agent.

The percentage of soluble dehydrating agent, alkali hydroxide, may vary considerably. The figure of .8 of a pound to one gallon of alcohol-water mixture has proved to be satisfactory. The percentage, however, may be higher or lower without departing from the essential features of the invention. Obviously also, the choice of equipment and the steps in the process are within the skill of those familiar with the art.

By the present invention in which a dehydrating agent soluble in the alcohol-water mixture is used, a process results in which the alcohol concentration may easily be carried above that of the constant boiling mixture, the solubility of the agent insuring ease of control and manipulation during the distillation as well as ease of handling after the distillation.

I claim:

1. The method of treating alcohol-water mixtures which comprises dissolving alkali hydroxide in the alcohol-water mixture, applying heat to the mixture, condensing and removing from the system a distillate whose composition is higher in alcohol than the constant boiling mixture, thereafter condensing and removing from the system a second portion containing less alcohol, and then stopping the distillation with sufficient alcohol and water remaining with the alkali hydroxide to keep it in a liquid condition at the temperature of distillation.

2. The method of treating alcohol-water mixtures which comprises dissolving alkali hydroxide in the alcohol-water mixture, applying heat to the mixture, condensing and removing from the system a distillate whose composition is higher in alcohol than the constant boiling mixture, thereafter condensing and removing from the system a second portion containing less alcohol, and then stopping the distillation when there is sufficient water with the alkali hydroxide to keep it in a liquid condition at the temperature of distillation but not sufficient to prevent its solidification at room temperature.

CARL HANER.